United States Patent Office 3,001,235
Patented Sept. 26, 1961

3,001,235
METHOD FOR THE MANUFACTURE OF A FORM-
ALDEHYDE POLYMER IN A CRAPE-CHIP FORM
Daisuke Komiyama, Takumi Takaki, Tatsuo Ando, and
Toru Nii, all of Kaneko, Niihama-shi, Japan, assignors
to Sumitomo Chemical Company, Ltd., Higashi-ku,
Osaka, Japan, a corporation of Japan.
Filed Feb. 4, 1959, Ser. No. 791,222
Claims priority, application Japan July 26, 1958
5 Claims. (Cl. 18—47.5)

This invention relates to methods for the manufacture of a formaldehyde polymer in a crape-chip form which has a low content of formic acid and improved solubility and dissolving rate.

The solubility of a linear polymer of formaldehyde known as lower polyoxymethyleneglycols or paraformaldehyde is an important factor in evaluating the product, which factor generally depends upon the amount of formic acid included as a by-product in the process as well as upon the degree of polymerization of formaldehyde. Also, as the form of a shaped formaldehyde polymer has an effect on the dissolving rate, the dissolving rate varies with the form of the shaped product even if the content of formic acid thereof is not changed. Accordingly, in order to produce a formaldehyde polymer of good solubility, it is necessary to give a careful consideration to the form of the product as well as to decreasing the content of formic acid therein. In all cases, a method for manufacturing a shaped formaldehyde polymer comprises cooling and solidifying a hot, aqueous solution of formaldehyde polymer. For this purpose, a method for obtaining amorphous particulates in a cooler while stirring and drying naturally, or a method of solidifying a hot, aqueous solution of formaldehyde polymer to a flaky form of product have ben proposed. In these methods, however, no attempt has been made to remove positively formic acid in the shaping and drying step. Thus in the conventional methods substantially all formic acid in a hot, aqueous solution of formaldehyde polymer introduced into a shaping step remains in the product, or the content of formic acid thereof tends to increase by drying.

The inventor considers in detail the shaping temperatures as well as the transformation of a formaldehyde polymer, and establishes a commercial method to decrease remarkably the content of formic acid in the formaldehyde polymer by a simple means effected after shaping.

According to our study on the transformation of a formaldehyde polymer, there exist an initial solidifying temperature (IST) and a non-fluidity temperature (NFT) with respect to the formaldehyde polymer.

The initial solidifying temperature (IST) means a temperature at which a solid phase begins to appear in a hot solution of formaldehyde polymer which has been maintained under a completely liquid phase while the non-fluidity temperature (NFT) means a transition temperature between the condition under which the liquid phase and the solid phase coexist and the condition under which apparently solid phase only exists, and it has now been found that both temperatures take respective constant values depending upon the concentrations of formaldehyde polymer.

According to the invention, we provide a method of manufacturing a formaldehyde polymer which comprises casting a hot, aqueous solution of formaldehyde polymer having a concentration of 60 to 95% over the surface of a metallic body maintained at temperatures below the non-fluidity temperature of $T1 = 83.5 + 3.35F$, wherein $T1$ is an absolute temperature and $F$ is a percent concentration of formaldehyde polymer calculated as formaldehyde, the non-fluidity temperature being calculated by applying the $T1$ equation to an 80% by weight of aqueous formaldehyde polymer solution calculated as formaldehyde, for example, $$T1 = 83.5 + 3.35 \times 80 = 351.5° K.$$

said temperature depending upon the concentration of formaldehyde polymer in the solution, such that the solution may be formed into a uniform thin layer, scraping said thin layer of the solidified material before the surface portion thereof is perfectly solidified, thus shaping the material into a crape-chip form, providing a penetrable bed, e.g. a multi-hole plate or a net made of metal or synthetic resin, to carry the material and drying the material, for example, by passing a dry inert gas through the bed.

In order that the invention may be fully understood, it will now be described with reference to the accompanying drawings, in which.

Figure 1:
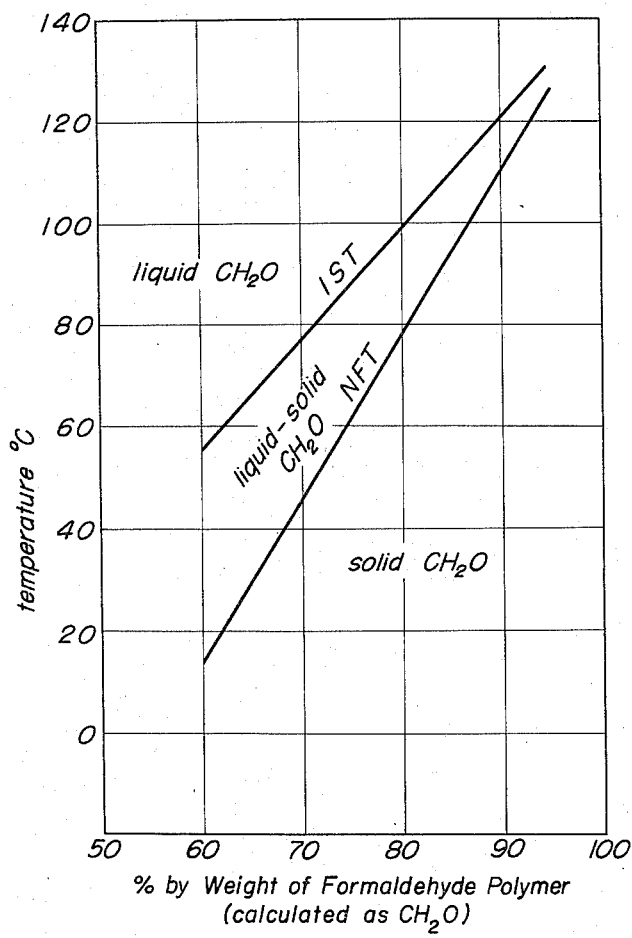
FIG. 1 is a graph showing the initial solidifying temperature and the non-fluidity temperature of an aqueous solution of formaldehyde polymer.

In FIG. 1 is a graph showing the relationship between the above-indicated temperatures for concentrations of formaldehyde polymer of from 60 to 95% calculated as formaldehyde. An aqueous solution of formaldehyde polymer exists as a liquid phase on the high temperature side above the IST line in FIG. 1, exists as both a liquid phase and a solid phase at temperatures between the IST line and the NFT line and exists as a solid phase at temperatures below NFT line. Accordingly it is necessary to bring an aqueous solution of formaldehyde polymer to the temperatures below the NFT line in order to solidify the solution to shape.

The concentrations of an aqueous formaldehyde polymer solution to be treated with the present invention are 60 to 95% calculated as formaldehyde.

As clearly shown in FIG. 1, a solution having a concentration below 60% calculated as formaldehyde has an NFT which is so low that it does not bring about a perfect solid phase at ordinary temperatures while it is difficult as a practical matter to obtain an aqueous solution having a concentration of more than 95% calculated as formaldehyde.

It is of course necessary to keep the metallic surface, on which a hot, aqueous solution of formaldehyde polymer having a concentration of 60–95% by weight calculated as formaldehyde is to be cast in a thin layer, at the temperatures below $T1 = 83.5 + 3.35F$, but it is desirable to select such temperatures well below the above point. The solution is then spread on and adheres to the metallic surface in a form of a thin layer. Although the lower portion thereof contacting the metallic surface is solidified substantially instantaneously, the upper portion takes a little more time to be solidified according to the relation with thermal conductivity. Thus both portions may be considered as the same solid phase but the apparent hardness is different depending on the respective layers of formaldehyde polymer, or in other words, there exists a hardness gradient from the upper portion to the lower portions of a thin layer.

Accordingly, when the layer is scraped off by a knife from the metallic surface, the upper surface of the scraped piece becomes wrinkled according to the variation of the partial strength of the thin layer and the scraped piece may take a form of a crape-chip.

The shaping in such form is preferable in view of the solubility of the product because of the very large specific surface area of the said product.

As a cooling metallic surface to be used in a continuous process, a rotary drum type shaping apparatus through which a cooling medium is passed may be used. When the drum is caused to dip partially in the hot solution of formaldehyde polymer and rotate therein, the solution is solidified in the form of a thin layer upon the surface of the immersed portion of the drum, and is continuously withdrawn from the solution. The resulting material withdrawn is then scraped off with a knife whereby a formaldehyde polymer shaped in a crape-chip form may be continuously obtained.

When the crape-chip polymer thus obtained is placed on the above mentioned bed and carried therewith in contact with a drying fluid, the drying step may also be effected in a continuous manner.

It is thus practical to use as a bed a fibrous or a stainless steel belt conveyor through which a drying gas is capable of passing. When the moving velocity of the net belt conveyor is set to $\frac{1}{5}$ to $\frac{1}{20}$ of the circumferential velocity of the rotary drum, the crape-chips adhere to a suitable thickness before introduction to the drying step.

It is preferable to dry the crape-chip in such inert gases as dried air or nitrogen. Although in the above described natural drying or in heat drying almost all of formic acid remains in the product, it is possible in the drying by means of a dry inert gas to remove such formic acid together with the water value. An important thing in the drying step is to pass a dry inert gas in such a manner that it is passed penetratingly through the bed surface on which the crape-chip is placed, whereby the elimination of formic acid and the drying efficiency are remarkably improved. A means of passing a dry inert gas in a direction parallel with the surface of the traveling bed on which the crape-chip is placed cannot bring about the effect of removing formic acid nor the improvement of the drying efficiency which would be expected in the case of passing the gas penetratingly through the bed. It is preferable that the dry inert gas is at relatively high temperatures, but gas having a temperature range of between $-30°$ and $+100°$ C. may be used in general.

Since it is possible, according to the invention, to remove formic acid from the shaped product, an aqueous solution of formaldehyde polymer having a comparatively high content of formic acid may be passed directly to the shaping step.

As the product of the invention contains either no formic acid or a very small amount of formic acid, it has a good solubility. Also, as the product has been shaped in a form of a crape-chip having a large specific surface area, it has a high dissolving velocity.

Figure 2:
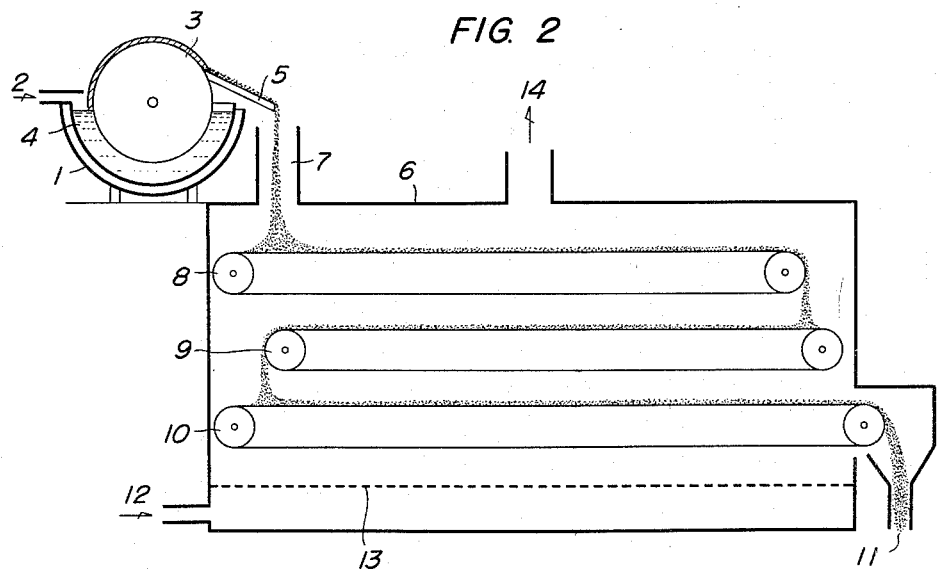
FIG. 2 is a diagrammatic view of apparatus illustrating one embodiment of the present invention.

In FIG. 2 diagrammatically illustrating one type of apparatus provided in accordance with the present invention, a hot solution of formaldehyde polymer which is maintained at a temperature above the IST line is continuously introduced into a reservoir 4 for the stock solution through a conduit 2 of a shaper 1. The stock solution, externally heated and maintained at a temperature above the IST line of FIG. 1, is solidified in the form of a thin layer on a rotary iron drum 3 through which a cooling medium is passed. The thin layer of the solidified formaldehyde polymer solution is scraped from the drum by a knife 5 fixed in contact with a portion of the surface of the drum to form a crape-chip, which is passed through a chute 7 to a dryer 6. The formaldehyde polymer which has been dried through the first net belt 8, the second net belt 9 and the third net belt 10 is withdrawn through a chute 11. The dry inert gas is introduced through an inlet 12 into the dryer 6, passing through a multi-hole partition 13 and thus through the flow of the formaldehyde polymer, and withdrawn through an outlet 14.

The following examples are given by way of illustration and are not intended as limitation on the scope of the present invention.

Example 1

A hot solution comprising 80% by weight of formaldehyde polymer calculated as formaldehyde, 19.85% by weight of water and 0.03% by weight of formic acid and maintained at about 100° C. is continuously solidified at a rate of 100 kg./hr. on the surface of a stainless steel drum rotating at a circumferential velocity of 10 m./min. through which a brine is passed at $-10°$ C. at the surface of the drum. The crape-chip or the solidified product of formaldehyde polymer obtained by scraping is placed on a net belt travelling at a velocity of 1 m./min. and carried therewith while a dry nitrogen gas ($+50°$ C., 1000 m.$^3$/hr.) is caused to flow and penetrate the bed surface of the net belt to dry the product. When the net belts are used in the three stages as shown in FIG. 2, the crape-chip thus obtained amounted to 94 kg./hr. and comprised 85% by weight of formaldehyde polymer calculated as formaldehyde, 14.98% by weight of water and 0.005% by weight of formic acid and the size of chips was from 5 to 10 mm. both in length and in breadth and about 0.5 mm. in thickness.

Example 2

A hot solution comprising 85% by weight of formaldehyde polymer calculated as formaldehyde, 14.9% by weight of water and 0.1% by weight of formic acid and maintained at about 110° C. is continuously solidified at a rate of 100 kg./hr. on the surface of a stainless steel drum rotating at a circumferential velocity of 12 m./min. through which a cooling water is passed at $+5°$ C. The crape-chip of formaldehyde polymer obtained by scraping is caused to drop on a net belt travelling at a velocity of 1 m./min. while a dry air at $+30°$ C. is caused to flow from lower to upper at a rate of 1500 m.$^3$/hr. and dry the product. One net belt used with the residence time of 10 minutes of the crape-chip, the composition became 87% by weight of formaldehyde polymer calculated as formaldehyde, 12.92% by wieght of water and 0.08% by weight of formic acid. When the two-stage net belts are used, the crape-chip comprising 91% by weight of formaldehyde polymer calculated as formaldehyde, 8.96% by weight of water and 0.04% by weight of formic acid was obtained in an amount of 93 kg./hr.

Example 3

A hot solution comprising 90% by weight of formaldehyde polymer calculated as formaldehyde, 9.85% by weight of water and 0.15% by weight of water and 0.15% by weight of formic acid and maintained at about 125° C. is continuously solidified at a rate of 140 kg./hr. on the surface of a Bakelite drum rotating at a circumferential velocity of 15 m./min. through which cooling water is passed at 15° C. on the surface of the drum. The crape-chip of formaldehyde polymer obtained by scraping is caused to drop on a net belt travelling at a velocity of 0.8 m./min. while dry air at $+100°$ C. is caused to flow upward through the net belt at a rate of 900 m.$^3$/hr. to dry the product. When one net belt is used when the residence time of the crape-chip is 25 min., the crape-chip comprising 95% by weight of formaldehyde polymer calculated as formaldehyde, 4.95% by weight of water and 0.05% by weight of formic acid is obtained in an amount of 126 kg./hr.

Example 4

A hot solution comprising 70% by weight of formaldehyde polymer calculated as formaldehyde, 0.02% by weight of formic acid and maintained at about 80° C. is continuously solidified at a rate of 80 kg./hr. on the surface of a polyvinyl chloride drum rotating at a circumferential velocity of 7 m./min. through which a brine is passed at $-10°$ C. on the surface of the drum. The crape-chip of formaldehyde polymer obtained by scraping is caused to drop on a net belt travelling at a velocity of 1.2 m./min. and carried therewith while dry nitrogen gas (−5° C., 8000 m.³/hr.) is caused to flow and penetrate through the net belt to dry the product on the net belt.

When the net belts are used in the nine stages the crape-chip thus obtained amounted to 65 kg./hr. and comprised 80% by weight of formaldehyde polymer calculated as formaldehyde, 19.99% by weight of water and 0.008% by weight of formic acid.

*Example 5*

A hot solution comprising 65% by weight of formaldehyde polymer calculated as formaldehyde, 14.99% by weight of water and 0.01% by weight of formic acid and maintained at about 70° C. is continuously solidified at a rate of 70 kg./hr. on the surface of a stainless steel drum rotating at a circumferential velocity of 6 m./min. through which a brine is passed at −30° C. on the surface of the drum. The crape-chip of formaldehyde polymer obtained by scraping is caused to drop on a net belt travelling at a velocity of 1.2 m./min. and carried therewith while dry nitrogen gas (−20° C., 10,000 m.³/hr.) is caused to flow and penetrate through the net belt to dry the product.

When the net belts are used in the eleven stages the crape-chip thus obtained amounted to 56 kg./hr. and comprised 75% by weight of formaldehyde polymer calculated as formaldehyde, 24.99% by weight of water and 0.005% by weight of formic acid.

What we claim is:

1. A method of manufacturing a formaldehyde polymer in a crape-chip form which comprises casting a hot aqueous solution of formaldehyde polymer having a concentration of 60 to 95% calculated as formaldehyde over a smooth surface of a body maintained at temperatures below non-fluidity temperature $T1 = 83.5 + 3.35F$, wherein $T1$ is an absolute temperature and $F$ is a percent by weight concentration of formaldehyde polymer calculated as formaldehyde, such that the solution is formed into a uniform thin layer, scraping said thin layer of the solidified material before the surface portion thereof is perfectly solidified, thus shaping the material into a crape-chip form, providing a bed to carry the material and passing a dry inert gas penetratingly through the bed to dry the material.

2. A method of manufacturing a formaldehyde polymer in a crape-chip form which comprises casting a hot aqueous solution of formaldehyde polymer having a concentration of 60 to 95% calculated as formaldehyde over one end of a smooth surface of a rotary cylinder type metallic body maintained at temperatures below non-fluidity temperature $T1 = 83.5 + 3.35F$, wherein $T1$ is an absolute temperature and $F$ is a percent by weight concentration of formaldehyde polymer having a concentration of 60–95% calculated as formaldehyde, such that the solution is formed into a uniform thin layer, continuousy scraping said thin layer of the solidified material at the opposite end of the surface before the surface portion thereof is perfectly solidified, thus shaping the material into a crape-chip form, causing the material to drop continuously on and be carried by a belt conveyor providing a penetrable bed, and passing a dry inert gas in such a manner that it penetrates the bed to dry the material.

3. A method according to claim 2 wherein said dry inert gas is air at a temperature of from −30° to +100° C.

4. A method according to claim 2 wherein said dry inert gas is a nitrogen gas at a temperature of from −30° to +100° C.

5. A method according to claim 2 wherein the travelling velocity of the belt conveyor providing the penetrable bed is maintained at ⅕ to 1/20 of the circumferential velocity of the rotary drum.

References Cited in the file of this patent
UNITED STATES PATENTS

| | | |
|---|---|---|
| 850,003 | Houchin et al. | Apr. 10, 1907 |
| 915,633 | Strickler | Mar. 16, 1909 |
| 1,583,484 | Morrison et al. | May 4, 1926 |
| 2,451,536 | Cupery et al. | Oct. 19, 1948 |
| 2,461,480 | Reckmeyer | Feb. 8, 1949 |
| 2,556,954 | Zeigler et al. | June 12, 1951 |
| 2,561,636 | Pyk | July 24, 1951 |
| 2,593,862 | Eickmeyer | Apr. 22, 1952 |

OTHER REFERENCES

Walker: "Formaldehyde and Its Polymers," from Industrial & Engn. Chem.; November 1931, 3 pp.